(12) United States Patent
Wells et al.

(10) Patent No.: US 6,310,915 B1
(45) Date of Patent: Oct. 30, 2001

(54) VIDEO TRANSCODER WITH BITSTREAM LOOK AHEAD FOR RATE CONTROL AND STATISTICAL MULTIPLEXING

(75) Inventors: Aaron Wells, Oakland, CA (US); Elliot Linzer, Bronx, NY (US)

(73) Assignee: Harmonic Inc., Sunnyvale, CA (US)

( * ) Notice: Subject to any disclaimer, the term of this patent is extended or adjusted under 35 U.S.C. 154(b) by 0 days.

(21) Appl. No.: 09/196,812

(22) Filed: Nov. 20, 1998

(51) Int. Cl.[7] .................................. H04B 1/66; H04N 7/12
(52) U.S. Cl. ................................... 375/240.03; 348/405.1
(58) Field of Search ........................ 348/405.1, 409.1, 348/410.1, 412.1, 415.1, 416.1, 419.1; 382/232, 236, 239; 370/538; 455/6.3; 375/240.01, 240.16, 240.17, 240.03; H04B 1/66; H04N 7/12

(56) References Cited

U.S. PATENT DOCUMENTS

| | | | |
|---|---|---|---|
| 5,537,440 | * 7/1996 | Eyuboglu et al. | 375/245 |
| 5,600,646 | * 2/1997 | Polomski | 370/263 |
| 5,686,963 | * 11/1997 | Uz et al. | 348/404 |
| 5,870,146 | * 2/1999 | Zhu | 178/405 |
| 6,012,091 | * 1/2000 | Boyce | 409/219 |
| 6,038,256 | * 3/2000 | Linzer et al. | 375/240 |
| 6,058,143 | * 6/2000 | Golin | 375/240 |
| 6,081,211 | * 6/2000 | De Queiroz et al. | 341/65 |
| 6,081,295 | * 6/2000 | Adolph et al. | 348/405 |
| 6,104,441 | * 8/2000 | Wee et al. | 348/722 |
| 6,104,991 | * 6/2000 | Newland et al. | 704/212 |

OTHER PUBLICATIONS

Nakajima et al., MPEG Audio Bit Rate Scaling On Coded Data Domain, Aucoustics, Speech and Signal Processing, 1998. Preceeding of the 1998 International Conference on , vol.: 6, 1998, pp. :3669–3672, 1998.*

Sun et al., Dynamic Bit Allocation In Video Combining For Multipoint Conference, Circuits and System II: Analog and Digital Signal Processing , IEEE Trans., vol. 45 Issue, pp. 644–648, May 1998.*

* cited by examiner

Primary Examiner—Chris Kelley
Assistant Examiner—Tung Vo
(74) Attorney, Agent, or Firm—Proskauer Rose LLP (57) ABSTRACT

A method is provided for transcoding, i.e., decoding, and re-encoding, a previously encoded video signal, to a second encoded representation. A number k>1 of previously encoded pictures of the previously encoded video signal are received in a buffer. Each of the k previously encoded pictures in the buffer is scanned to gather information on each of the k previously encoded pictures. An encoding parameter is allocated to a first one of the k previously encoded pictures which precedes each other one of the k previously encoded pictures in encoded order of the previously encoded video signal. The encoding parameter is allocated based on the information gathered for each of the k previously encoded pictures. The first previously encoded picture is decoded to produce a decoded picture. The decoded picture is re-encoded to generate a re-encoded picture in a second encoded representation of the video signal. The re-encoding is performed in a fashion which depends on the encoding parameter allocated thereto. An apparatus is also disclosed for carrying out the method including a buffer, a scanner (for performing the scanning and allocating steps), a decoder and an encoder.

84 Claims, 2 Drawing Sheets

VIDEO TRANSCODER WITH BITSTREAM LOOK AHEAD FOR RATE CONTROL AND STATISTICAL MULTIPLEXING

RELATED APPLICATIONS

The following patent and patent applications contain subject matter which is related to the subject matter of this application:

(1) U.S. patent application Ser. No. 08/55,447, entitled "Compressed Video Transcoder," filed on Nov. 22, 1996 for Aaron Wells and Elliot Linzer;

(2) U.S. patent application Ser. No. 08/775,313, entitled "Statistical Multiplexed Video Encoding Using Pre-Encoding A Priori Statistics And A Posteriori Statistics," filed on Dec. 31, 1996 for Elliot Linzer and Aaron Wells;

(3) U.S. patent application Ser. No. 09/084,690, entitled "Delay Balanced Video Encoder System," filed on May 26, 1998 for Elliot Linzer;

(4) U.S. Pat. No. 5,686,963, entitled "Method For Performing Rate Control In A Video Encoder Which Provides a Bit Budget for Each Frame While Employing Virtual Buffer Verifiers," filed on Dec. 26, 1995 for K. Metin Uz and Aaron Wells; and (5) U.S. Provisional Patent Application Ser. No. 60/099,836, entitled "Digital Video Processor with Border Processor." filed Sep. 11, 1998 for Elliot Linzer and Aaron Wells.

The above-listed patent and patent applications are commonly owned by the assignee of this application and the contents of the above-listed patent and patent applications are incorporated herein by reference. This application is a continuation-in-part of U.S. patent application Ser. No. 08/775,313.

FIELD OF THE INVENTION

The present application pertains to video encoding. In particular, the present invention pertains to re-encoding a previously encoded video signal.

BACKGROUND OF THE INVENTION

The MPEG-2 standard is widely used for encoding video. According to this standard, pictures are both spatially and temporally encoded. Each picture is first divided into non-overlapping macroblocks, where each macroblock includes a 16×16 array of luminance samples and each block or array of 8×8 chrominance samples overlaid thereon. A decision is made to encode the macroblock as an inter macroblock, in which case the macroblock is both temporally and spatially encoded, or to encode the macroblock as an intra macroblock, in which case the macroblock is only spatially encoded. A macroblock is temporally encoded by an inter-picture motion compensation operation. According to such an operation, a prediction macroblock is identified for the to-be-motion compensated macroblock and is subtracted therefrom to produce a prediction error macroblock. The prediction macroblock originates in another picture, called a reference picture, or may be an interpolation of multiple prediction macroblocks, each originating in different reference pictures. The prediction macroblock need not have precisely the same spatial coordinates (pixel row and column) as the macroblock from which it is subtracted and in fact can be spatially offset therefrom. A motion vector is used to identify the macroblock by its spatial shift and by the reference picture from which it originates. (When the prediction macroblock is an interpolation of multiple prediction macroblocks, a motion vector is obtained for each to-be-interpolated prediction macroblock).

Pictures may be classified as intra or I pictures, predictive or P pictures and bidirectionally predictive or B pictures. An I picture contains only intra macroblocks. A P picture may contain inter macroblocks, but only forward directed predictions from a preceding reference picture are permitted. A P picture can also contain intra macroblocks for which no adequate prediction was found. In addition, a dual prime prediction may be formed for a P picture macroblock in an interlaced picture, which is an interpolated prediction from the immediately two preceding reference fields. A B picture can contain intra macroblocks, inter macroblocks that are forward direction motion compensated, inter macroblocks that are backward directed motion compensated, i.e., predicted from a succeeding reference picture, and inter macroblocks that are bidirectionally motion compensated, i.e., predicted from an interpolation of prediction macroblocks in each of preceding and succeeding reference pictures. If the P or B pictures are interlaced, then each component field macroblock can be separately motion compensated or the two fields can be interleaved to form a frame macroblock and the frame block can be motion compensated at once.

Spatial compression is performed on selected 8×8 luminance pixel blocks and selected 8×8 pixel chrominance blocks of selected prediction error macroblocks, or selected intra macroblocks. Spatial compression includes the steps of discrete cosine transforming each block, quantizing each block, zig-zag (or alternate) scanning each block into a sequence, run-level encoding the sequence and variable length encoding the run-level encoded sequence. Prior to discrete cosine transformation, a macroblock of a frame picture may optionally be formatted as a frame macroblock, including blocks containing alternating lines of samples from each of the two component field pictures of the frame picture, or as a field macroblock, where the samples from different fields are arranged into separate blocks of the macroblock. The quantizer scale factor may be changed on a macroblock-by-macroblock basis and the weighting matrix may be changed on a picture-by-picture basis. Macroblocks, or coded blocks thereof, may be skipped if they have zero (or nearly zero) valued coded data. Appropriate codes are provided into the formatted bitstream of the encoded video signal, such as non-contiguous macroblock address increments, or coded block patterns, to indicate skipped macroblocks and blocks.

Additional formatting is applied to the variable length encoded sequence to aid in identifying the following items within the encoded bitstream: individual sequences of pictures, groups of pictures of the sequence, pictures of a group of pictures, slices (contiguous sequences of macroblocks of a single macroblock row) of pictures, macroblocks of slices and motion vectors and blocks of macroblocks. Some of the above layers are optional, such as the group of pictures layer and the slice layer, and may be omitted from the bitstream if desired. (If slice headers are included in the bitstream, one slice header is provided for each macroblock row.) Various parameters and flags are inserted into the formatted bitstream as well indicating each of the above noted choices (as well as others not described above). The following is a brief list of some of such parameters and flags: picture coding type (I,P,B), macroblock type (i.e., forward predicted, backward predicted, bidirectionally predicted, spatially encoded only) macroblock prediction type (field, frame, dual prime, etc.), DCT type (i.e., frame or field macroblock format for discrete cosine transformation), the quantizer scale code, etc. A repeat_first_field flag may be inserted into the encoded video signal to indicate that a field repeated during a telecine process of converting film frames to NTSC video (using the well known 3:2 pull-down technique) was omitted from the encoded video signal. In addition, error concealment motion vectors optionally may be provided with intra macroblocks for motion compensated recovery of another macroblock in the event the other macroblock is corrupted due to an error.

In encoding the video signal according to MPEG-2, the encoder must produce a bitstream which does not overflow or underflow the buffer of a decoder which decodes the video signal. To that end, the encoder models the decoder's buffer and, in particular, monitors the fullness of the decoder's buffer. The decoder buffer is presumed to fill with bits of the bitstream at a particular rate which is a function of the channel rate at a certain moment of time. Pictures are presumed to be instantly removed at a particular instant relative to the decode and presentation time of each picture. See U.S. patent application Ser. No. 09/084,690 for an in-depth discussion of the modeling of the decoder buffer by an encoder. Using such a model, the encoder can adjust various encoding parameters to control the number of bits produced for each encoded picture in an effort to prevent overflowing or underflowing the decoder's buffer. For example, the encoder can adjust the quantizer scale factor, encourage selection of certain types of encoding over others, add stuffing data to pictures, change the number of B and P pictures, change a threshold quality level used in determining whether to perform intra or inter coding of macroblocks, etc., to increase or reduce the number of bits produced for each picture. Generally speaking, the encoder forms a target bit budget for each picture, which is a function of, among other parameters, the channel rate, the decoder buffer size (normally assumed to be a certain constant), and the vacancy/occupancy of the decoder's buffer immediately before and after removal of the particular picture for which a budget is being generated. The encoder then adjusts its encoding in an attempt to achieve the target bit budget for the picture.

Occasionally, it is desired to re-encode a previously encoded video signal. For example, in some video server or network situations, it is desirable to re-encode the video signal in a fashion other than it was originally encoded to meet network congestion/bandwidth availability constraints, to provide the video signal to different users with varying decoder capability, etc. In another example, a video signal is prepared in one format for professional delivery (for example, IF editing prior to broadcast), and is later to be delivered in a format suitable for consumer use (e.g., broadcast of the final edited version). U.S. patent application Ser. No. 08/775,313 teaches an advantageous transcoder which decodes a received, encoded video signal and then re-encodes the video signal. The transcoder taught in this incorporated patent application has a decoder which optionally provides auxiliary information or meta data to the encoder of the transcoder for IS facilitating the encoding. Such meta data may be indicative of different kinds of information contained in the bitstream as originally encoded such as, the motion vectors used, number of bits per picture, quantization scale factors, type of prediction for each macroblock, field or frame formats used for macroblocks, picture coding types and locations of repeat fields. Such meta data indicates various decisions previously made in encoding the video signal which can frequently be re-used in whole or in part. For example, repeat field decisions can usually be re-used so long as the video standard does not change. Alternatively, or additionally, motion vectors may be used wholly or to indicate a smaller search window for identifying candidate prediction macroblocks than would otherwise normally be necessary.

Generally speaking, it is desirable to use the same picture coding type and the same intra/inter macroblock decisions in the subsequent encoding of the transcoding operation as was done in originally encoding the video signal fed to the transcoder. This maintains picture quality. When encoding a picture, it is not necessary to use a fixed group of pictures structure, field/frame format or a regular field display code. Normally, an encoder has many choices in encoding a video signal, especially in regard to preventing decoder buffer overflow and underflow. However, in the case of a transcoder, the picture coding type and inter/intra macroblock decision is preferably constrained to be the same during a successive encoding as it was during the previous encoding. As such, the encoder of a transcoder has only two options available for varying the encoding. First, while the transcoder's decoder decodes pictures of the bitstream, information regarding the decoded picture types can be gathered. The transcoder's encoder extrapolates from this information as to what picture types are expected and allocates bits accordingly. However, this solution does not work well if the group of pictures structure of the bitstream changes. For example, the group of picture structure can change from IBBPBBPBBPBBI to IIIIIII. In such a case, the extrapolation of picture coding type will be erroneous. In the example above, the unanticipated rise in I picture frequency will result in a incorrect allocation of bits and degraded quality for unanticipated I pictures.

Second, the transcoder can make no assumption about picture types and simply scale the number of bits used in the original encoding according to the ratio of the bit rate of the originally encoded bitstream to the bit rate of the re-encoded bitstream produced by the transcoder. However, this solution does not work well if the bit rate of the originally encoded bitstream fed to the transcoder is far higher than the bit rate of the re-encoded bitstream produced by the transcoder. The reason for this is that the difference in the number of bits used for different picture coding types is inversely correlated with the bit rate of the signal. Thus, at very high bit rates, B pictures have a similar number of bits of encoded data as I pictures yet at low bit rates, I pictures have far more bits of encoded data than B pictures.

A video program normally includes an encoded video signal and at least one encoded audio signal (although the video program can include a second encoded audio signal, a closed captioned text signal, and other auxiliary signals). Often, it is desired to combine multiple video programs and transmit the combined signal on a transmission channel having a particular channel bit rate. A preferred manner of combining and transmitting such video programs is to statistically and dynamically allocate the channel bit rate amongst all video programs. The dynamic statistical allocation can be done in a fashion to attempt to achieve the same quality over all combined video programs. For example, assume that first and second video programs are to be combined, wherein the first video program carries a low complexity video event, such as a talk show, and the second video program carries a high complexity event, such as a football game. As is known, a high complexity event with high inter-picture motion, such as a football game, will require a higher bit rate to maintain the same quality as a low complexity event with low inter-picture motion, such as a talk show. Thus, the first video program is likely to be allocated lower channel bit rates than the second video program in order to maintain the overall quality between the two video programs approximately the same.

U.S. patent application Ser. No. 08/775,313 teaches a system in which multiple encoders are provided, including one encoder for encoding a corresponding one of multiple video signals to be multiplexed together. While encoding these video signals, the encoders gather a priori "pre-encoding statistics" for these video signals such as: a number of bits generated for each compressed picture, an average quantization level, picture types, scene change locations and repeat field patterns. These statistics are stored in a storage medium. According to one embodiment, the encoded video signals are stored in encoded form in the storage medium (or another storage medium) as well. Multiple transcoders are provided including one transcoder for transcoding each encoded video signal. The above-noted, previously generated a priori, pre-encoding statistics are provided to a statistics computer. Using such statistics as an indication of the complexity of encoding the video signal, the statistics computer allocates a fraction of the transmission medium bit rate to each transcoder. The bit rates determined by the statistics computer may be generated in a fashion to approximately average the quality of each transcoded video signal at that moment in time. Each transcoder then adjusts its re-encoding according to the newly allocated bit rates. In particular, each transcoder adjusts the rate at which bits of the encoded video signal are presumed to fill the decoder buffer in the model of the decoder buffer maintained at the transcoder according to the newly allocated transmission rate. This in turn affects the number of bits each transcoder allocates to each picture during the re-encoding process.

The technique taught in this incorporated application can provide superior results in the statistical multiplexing scenario. However, this technique assumes that the raw, unencoded video is available for pre-encoding gathering of statistics. This is not always the case. For example, the originally encoded video signal may have been generated at a remote location and/or using an encoder not under the control of the operator who wishes to perform a subsequent transcoding. In addition, it is desirable to provide a solution for adjusting bit budgets for individual video signals even when the channel rate allocated to carrying the re-encoded video signal does not vary. It is therefore desirable to provide a more general solution to the bit allocation problem in the context of transcoding.

SUMMARY OF THE INVENTION

This and other objects are achieved according to the present invention. According to one embodiment, a method is provided for transcoding, i.e., decoding, and re-encoding, a previously encoded video signal, to a second encoded representation. A number k>1 of previously encoded pictures of the previously encoded video signal are received in a buffer. Each of the k previously encoded pictures in the buffer is scanned to gather information on each of the k previously encoded pictures. An encoding parameter is allocated to a first one of the k previously encoded pictures which precedes each other one of the k previously encoded pictures in encoded order of the previously encoded video signal. The encoding parameter is allocated based on the information gathered for each of the k previously encoded pictures. The first previously encoded picture is decoded to produce a decoded picture. The decoded picture is re-encoded to generate a re-encoded picture in a second encoded representation of the video signal. The re-encoding is performed in a fashion which depends on the encoding parameter allocated thereto.

Illustratively, any combination of the following information may be gathered from the k pictures: (a) the picture coding type (i.e., I, P or B), (b) the total number of bits contained in each encoded group of pictures, picture, slice or other selected portions of pictures, (c) the number of stuffing bits added to each picture, (d) the total number of header bits of the previously encoded pictures, (e) the number of bits used to represent the variable length encoded data and/or headers of the macroblocks (which can be separately counted), (f) the field display code of each picture (which indicates over how many field periods the picture will be displayed), (g) picture structure (i.e., field or frame format), (h) macroblock mode decisions taken (i.e., skipped, intra, forward predicted, backward predicted, bidirectionally predicted, no coefficient data) in each picture or selected potions/subregions thereof (e.g., in letter-boxing areas of the picture), (i) macroblock DCT format (i.e., field format or frame format), (j) quantization scale factors used in the encoded IQ pictures or selected portions/subregions thereof, (l) motion vectors encoded, (m) motion vector ranges, (n) bits used to encode error-concealment motion vectors and slice headers (which may be separately counted), (o) the channel rate assigned to the video signal (e.g., as determined by monitoring the transport delivery of the encoded program signal), and (p) characteristics of the content of the video, such as scene changes, dissolves, fades, slow motion sequences, etc. Such is information may indicate the compressed representation, compression efficiency, encoding standard, selectable encoding parameters, or characteristics of uncompressed content, of the k pictures.

The encoding parameter can simply be a budget of a number of bits to produce for the re-encoded picture depending on the information gathered for the other previously encoded pictures and in accordance with a model of a buffer of a decoder which is presumed to decode the second encoded representation of the video signal. In such a case, the decoded picture is re-encoded to produce a number of bits which depends on the budget. In the alternative, or in addition, the re-encoding encoding can occur in a statistical multiplexing context. In such a context, the encoding parameter may be a channel rate on which transfer of the re-encoded video signal to a channel depends. In such a case, the model of the decoder buffer is altered to fill at the channel rate indicated by the parameter instead or as well.

In the alternative, or in addition, the following are additional actions which may be taken in dependence on the encoding parameter: changing picture resolution, spatially low pass filtering pictures, modifying picture data at a border of a picture, temporally filtering pictures, accounting for the number of fields during which each encoded picture is presented in allocating channel bit rates, switching between progressive and interlaced picture structure, enabling (retaining or adding) or disabling (discarding or refraining from generating) error-concealment motion vectors, enabling (retaining or adding) or disabling (discarding ro refraining from generating) slice headers, adjusting a decision function which determines the particular encoding mode to use, adjusting a decision function which determines whether or not to use the same macroblock encoding decisions as were used originally, and choosing to follow the same decisions as originally used for intra pictures.

Illustratively, the scanner can be implemented using a full or partial decoder, a transcoder with a full encoder or a transcoder with a partial encoder. Thus, the operation of scanning can include at least partial decoding, and/or at least partial encoding, of the previously encoded video signal. However, the scanner can also simply be a parser and the operation of scanning can simply comprise examining the various control parameters and flags of, and/or counting the bits in, (each group of pictures, each picture, each slice, etc. of) the previously encoded video signal.

In an illustrative embodiment, an end of a previously encoded video signal is spliced together with a beginning of another encoded video signal for sequential transfer to the channel. In such a case, a previously encoded picture at an end of the previously encoded video signal and at least one previously encoded picture at a beginning of the other video signal are stored in the look ahead buffer. Information is gathered regarding one or more encoded pictures at the beginning of the other encoded video signal as well as the picture at the end of the previously encoded video signal. The picture at an end of the previously encoded video signal is re-encoded in accordance with an encoding parameter based on information gathered for that picture as well as for the pictures at the beginning of the other encoded video signal. For example, a picture coding type may be selected for encoding the decoded picture at the end of the previously encoded video signal.

DETAILED DESCRIPTION OF THE INVENTION

Figure 1:
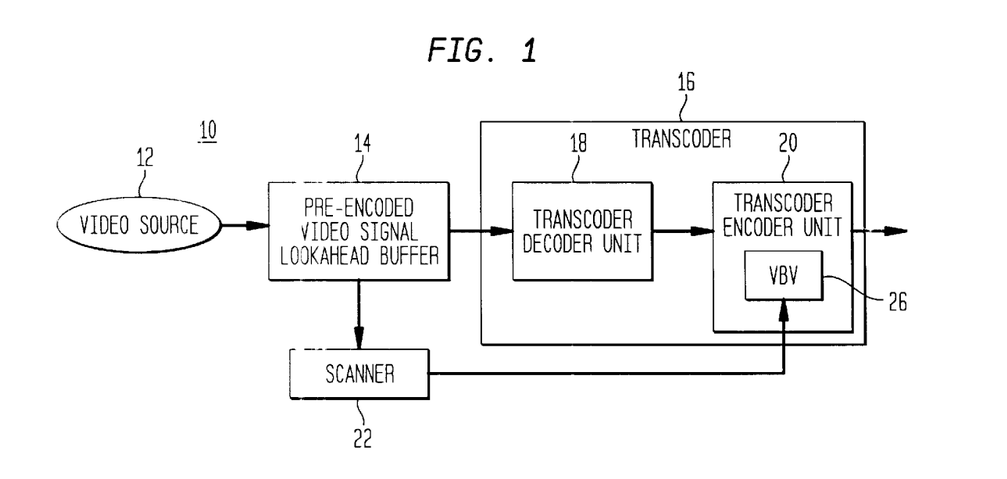
FIG. 1 shows a transcoding system according to a first embodiment of the present invention.

FIG. 1 shows a transcoding system 10 according to an embodiment of the present invention. The system 10 includes a video source 12, a look ahead buffer 14, a transcoder 16 and a scanner 22. The video source 12 may be a camera, network terminal, video tape player/recorder, optical/magnetic disc server, video editor or the like. The look ahead buffer 14 may be an optical/magnetic disc, memory circuit or the like. The transcoder 16 is shown as including a transcoder decoder unit 18 and a transcoder encoder unit 20. Such a transcoder 16 may be implemented using one or more suitably programmed DV Expert™ video encoder integrated circuits, distributed by C-Cube Microsystems, Inc.™, a company located in Milpitas, Calif., acting in concert. The decoder 18 can be a normal full decoder and the encoder 20 can be a normal full encoder which decoder 18 and encoder 20 are connected together. Preferably, the transcoder 16 has a decoder-encoder configuration which is optimized for transcoding, such as is disclosed in incorporated U.S. patent application Ser. No. 08/755,477. The scanner 22 may be implemented using a suitably programmed parsing processor or finite state automata. Alternatively, the scanner is implemented using a video decoder or transcoder, such as a suitably programmed DV Expert™ video encoder. Depending on the processing needed to be applied in transcoding (i.e., the resolution, color format, video encoding standard, picture structure, etc.) the inputted, previously encoded video to be transcoded, and the processing needed to be applied in scanning (described below), it is possible to use a single bank of one or more suitably programmed DV Expert™ video encoders to implement the transcoder 16 and scanner 22 in a multi-tasking fashion. The encoder 20 is shown as including a video buffer verifier 26 which receives information from the scanner 22.

Figure 2:
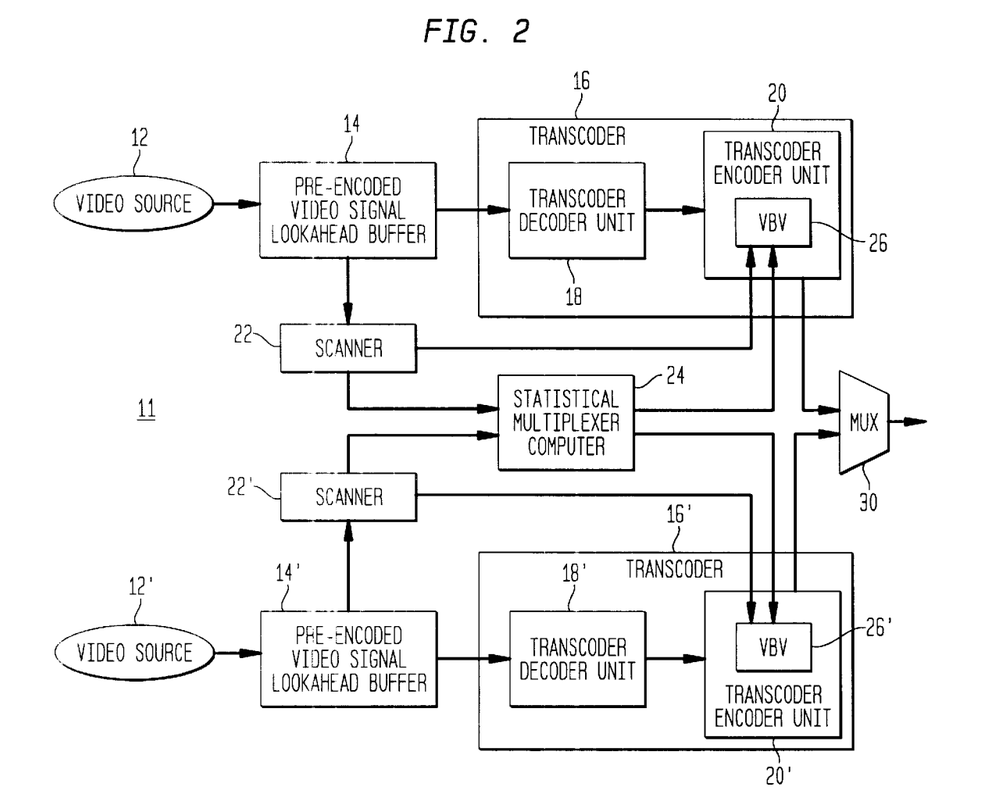
FIG. 2 shows a transcoding system according to a second embodiment of the present invention.

FIG. 2 shows another system 11 according to an embodiment of the invention. The system 11 includes the same parts as FIG. 1, i.e., a video source 12, a look ahead buffer 14, a transcoder 16 and a scanner 22. In addition, the system 11 has a second apparatus 12', 14', 16', and 22' for producing another encoded video signal to be multiplexed with the re-encoded video signal produced by the transcoder 16. Illustratively, the second apparatus 12', 14', 16', and 22' is a like transcoder apparatus including a video source 12', a look ahead buffer 14', a transcoder 16' and a scanner 2'. The transcoder 16' includes a decoder 181 and an encoder 20'. The encoder 20' is shown as having a video buffer verifier 26' which receives information from the scanner 22'.

A multiplexer 30 is also provided which receives the re-encoded video signals outputted from the transcoders 16 and 16'. Both scanners 22 and 22' provide information to a statistical multiplexer computer 24. The statistical multiplexer computer 24 outputs information to (for example, the video buffer verifiers 26, 26' of) each encoder 20, 20'. Illustratively, at least the elements 14 and 16 can be implemented using a suitably programmed Program Encoder™ distributed by Divicom, Inc.™, a company located in Milpitas, Calif. Likewise, the elements 14' and 16' can be implemented using a suitably programmed Program Encoder™. The multiplexer 30 can be implemented using a suitably programmed System Remultiplexer™ distributed by Divicom, Inc.™ and the statistical multiplexer computer 24 can be implemented using a terminal attached to the multiplexer 30. However, other implementations are possible including implementing all of the elements 12–30 and 12'–26' using a single computer terminal that can have one or more DV Expert™ video encoders installed therein.

Unlike the apparatus and method disclosed in co-pending U.S. patent application Ser. No. 08/775,313, it is assumed that the raw, unencoded video signal (i.e., the video signal with no encoding applied thereto) is unavailable to the systems 10 and 11. This may be true for several reasons beyond control such as: (1) the encoder that performs the original encoding is remote from the system 10 or 11 and not under control of the same operator, (2) the operator chooses an "off-the shelf" encoder to perform the original encoding which encoder is difficult to modify to generate pre-encoding statistics, or (3) while accessible to the operator, a vast quantity of different encoded video signals must be available or the precise format, standard and parameters of the final, to-be-outputted encoded video signal are unknown at the time of the original encoding. In the latter situation, a vast amount of storage would be needed to store each possible encoded representation of the video signal which might be requested. The latter situation may be common where original source video is captured in encoded form for archival purposes so as to enable later playback in a selectable form (e.g., resolution, encoding standard, video standard, color format, picture structure, bit rate, etc.) or in a form to be decided in the future. In such a case, it is usually desirable to generate an encoded representation of the highest quality that can be accommodated by the encoding and storage resources. Later, when it is desired to playback the video signal, the video signal is illustratively transcoded using a system 10 or 11 to produce the desired second encoded representation.

The operation of the system 10 is first described. In operation, the video source 12 produces a previously encoded representation of a video signal. This video signal illustratively is already encoded according to the MPEG-2 standard, although other standards, such as MPEG-1, motion JPEG, etc. may be used. The previously encoded video signal is received in the look ahead buffer 14 where it is temporarily stored. The look ahead buffer can store k>1 compressed pictures and therefore provides a delay of k picture display intervals to the previously compressed video signal. In an NTSC broadcast delivery application, where the previously encoded pictures have a frame picture structure, k can be set to a large number such as 30 frame pictures (thereby causing a 1 second delay) since such an application can tolerate such a high latency.

While in the look ahead buffer 14, the encoded pictures are scanned by the scanner 22. During the scanning, the scanner 22 gathers information regarding each encoded picture that is stored in the look ahead buffer 14. Illustratively, the scanner 22 can gather any combination of one or more types of information (described below). After a delay of k pictures, each encoded picture is outputted from the look ahead buffer 14 to the transcoder 16. The decoder 18 of the transcoder 16 decodes each received compressed picture and provides it to the encoder 20 of the transcoder 16. The encoder 20 of the transcoder 16 re-encodes the decoded picture to produce a second encoded representation of the video signal. As shown, the encoder 20 receives information, i.e., one or more encoding parameters, which may be based on the information gathered by the scanner 22 for the picture and the k-1 pictures which follow it in the previously encoded bitstream. Based on this information, the encoder 20 varies the encoding applied to each picture. As an example, the video buffer verifier 26 of the encoder 20 is shown as receiving the information from the scanner 22, although any decision making unit or processor of the encoder 20 which can control encoding in a fashion as described below may receive the information.

The operation of the system 11 is very similar to that of the system 10 except as follows. The video sources 12 and 12' output encoded video signals to the look ahead buffers 14 and 14' simultaneously, although not necessarily synchronously. The scanners 22 and 22' scan the encoded video pictures in their respective look ahead buffer 14 or 14' and output information to their corresponding encoder 20 or 20'. In addition, each scanner 22 and 22' outputs information to the statistical multiplexer computer 24. Such information is also a priori information regarding the future k pictures. In response, the statistical multiplexer computer 24 process the received information in order to determine a fraction of the available channel bit rate to allocate for the re-encoded video signals outputted from the encoders 20 and 20'. The statistical multiplexer computer 24 outputs information, i.e., one or more encoding parameters, regarding the allocated channel bit rate to each of the encoders 20 and 20'. In addition to using the information provided by its respective scanner 22 or 22' to vary encoding, the encoders 20 and 20' use the channel bit rate allocation information to vary encoding, in a fashion as described below.

As noted above, each scanner 22 and 22' gathers information regarding each picture and the k-1 pictures that follow it in the previously encoded video signal. The scanners 22 or 22' can gather any combination of the following non-exhaustive list of useful information about the previously encoded pictures: (a) the picture coding type (i.e., I, P or B), (b) the total number of bits contained in each encoded group of pictures, picture, slice or other selected portions of pictures, (c) the number of stuffing bits added to each picture, (d) the total number of header bits of the previously encoded pictures, (e) the number of bits used to represent the variable length encoded data and/or headers of the macroblocks (which can be separately counted), (f) the field display code of each picture (which indicates over how many field periods the picture will be displayed), (g) picture structure (i.e., field or frame format), (h) macroblock mode decisions taken (i.e., skipped, intra, forward predicted, backward predicted, bidirectionally predicted, no coefficient data) in each picture or selected potions/subregions thereof (e.g., in letter-boxing areas of the picture), (i) macroblock DCT format (i.e., field format or frame format), (j) quantization scale factors used in the encoded pictures or selected portions/subregions thereof, (l) motion vectors encoded, (m) motion vector ranges, (n) bits used to encode error-concealment motion vectors and slice headers (which may be separately counted), (o) the channel rate assigned to the video signal (e.g., as determined by monitoring the transport delivery of the encoded program signal), and (p) characteristics of the content of the video, such as scene changes, dissolves, fades, slow motion sequences, etc. Note that much of the information indicated above can be determined by a simple parsing of the bit stream. However, certain types of information, such as detecting a scene change, fade, dissolve, etc. can only be determined by at least partly decoding the bitstream and comparing the pixel data of each scene. In such a case, the scanner 22 and/or 22' preferably includes a video decoder. A full decoding is not required to gather certain kinds of information. Thus, the functions such as inverse discrete cosine transformation, reconstruction of macroblocks from prediction errors and predictions and picture reordering for presentation can be omitted. Inasmuch as these functions account for the bulk of memory utilization, a reduction in memory requirement and processing is achieved by their omission. Other kinds of information, such as information indicative of scene changes, might require a full decoding to enable gathering thereof. In such a case, the scanner 22 and/or 22' includes a full decoder.

In some applications, it is desirable to gather even more accurate information. For example, suppose that the original encoded video is encoded at a very high bit rate and used motion compensation quite sparingly. If the second encoded representation has a much lower bit rate, to be achieved by inter coding macroblocks, then it is desirable to have preliminary information regarding some of the choices now available for encoding the video (such as group of picture structure, progressive/interlaced picture structure, macroblock type, etc.) In such a case, the scanner 22 and/or the scanner 22' may include both a decoder and an encoder. Again, it might not be necessary for the encoder of the scanner 22 or 22' to be a full encoder. Certainly, variable length coding can be omitted. However, it might also be desirable to omit the spatial encoding (discrete cosine transformation, quantization, etc.) as well. In the alternative, the encoder of the scanner 22 or 22' can perform full encoding.

The information provided by the scanner 22 or 22' may indicate the encoded representation of the previously encoded video signal (e.g., the bit rate, color format, video format/standard, resolution, aspect ratio, frame rate, field/frame picture structure, progressive/interlace sequence), encoding efficiency (e.g., average number of bits per picture in the previously encoded signal divided by number of bits per decompressed picture), the method of encoding (e.g., which encoding standard was used to encode the previously encoded video signal), the choices made in encoding (e.g., group of picture structure, use of intra slice refresh, use of bidirectional or dual prime prediction, etc.), parameters of the encoding (e.g., average quantizer scale factor per macroblock or picture, number of bits per encoded picture, effective frame rate, etc.) or characteristics of the original content (ocation of scene changes, fades, dissolves, low motion picture sequences, etc.) Any combination of the above information can be provided from the scanners 22 and 22' to the corresponding encoder 20 or 20'. In addition, in the system 11 of FIG. 2, the encoders 20 and 20' receive channel rate allocation information from the statistical multiplexer computer 24. In response to receiving such information, the encoders 20 and 20' attempt to preemptively adjust encoding in order to more optimally re-encode the video signal. To that end, the encoders 20 and 20' or statistical multiplexer computer 24 can take any combination of actions, such as the actions in the following non-exhaustive list:

(1) Change picture budgets: An estimate for picture budgets may be formed, for example, as is suggested in incorporated U.S. Pat. No. 5,686,963. Normally, bit budgeting only takes into account a posteriori information based on prior numbers of bits produced per picture. According to one embodiment, the encoder 20 or 20' also adjusts target bit budgets for pictures based on information regarding future bit budget needs.

(2) Change channel bit rate: In some systems, bit budgeting normally assumes that the channel rate by which the decoder buffer fills with the re-encoded video signal remains constant. However, in statistical multiplexing systems, it is desirable to dynamically adjust the channel rate allocated to each video program according to the encoding complexities experienced by each encoder at that moment in time. According to the invention, the statistical multiplexer computer 24 uses a priori information (i.e., information regarding upcoming encoding events in the k-1 pictures that follow the current picture) to allocate a total available channel bit rate amongst each of the encoders 20 and 20'. Moreover, such a priori information need not have been prepared during the original encoding in generating the previously encoded video signals stored in the video sources 12 and 12'. Rather, such a priori information is generated at the time of playback using the look ahead buffers 14 and 14' and the scanners 22 and 22'. Adjustments to the channel rate impact the decoder buffer model maintained by the video buffer verifiers 26 and 26'.

(3) Change picture resolution: One technique for reducing the number of bits in the re-encoded video signal is to (vertically or horizontally) sub-sample the decoded pictures of the video signal. For example, the encoders 20 and 20' can decimate or subsample the decoded pictures in the horizontal direction prior to re-encoding. The encoders 20 and 20' then re-encode the video signal at its reduced spatial resolution. Upon decoding the re-encoded video signal, the decoder will interpolate the decoded picture and display it at the normal dimensions of the display screen.

(4) Spatially low pass filter the pictures: According to this technique, the encoders 20 and 20' horizontally and/or vertically spatially low pass filter the pictures (without reducing their resolution). The encoders 20 and 20' then encode the low pass filtered pictures.

(5) Modify pixel data of picture borders: According to this technique, prior to encoding, the encoders 20 and 20' process the pixels at the topmost, bottommost, leftmost and rightmost macroblocks of the pictures to make them simpler to compress. For instance, the pixels in such border macroblocks of the picture can be set to a single value (e.g., black) or to the same values as adjacent visible pixels. The pictures with filtered/replaced border pixels are then encoded by the encoders 20 and 20'.

(6) Temporally filter the pictures: It is also possible to average the intensity of pixel levels (luminance and chrominance) over several pictures. Preferably this is done as follows. The encoders 20 and 20' average the (luminance and chrominance) levels of pixels in the same spatial coordinates but different pictures, which pixels exhibit little motion, and substitute the average level for such pixels. The encoders 20 and 20' do not change the levels of pixels exhibiting high motion. As can be appreciated, if low motion is detected for pixels over a sequence of several pictures, it is likely that the pictures are static and that any variation in pixel levels is caused by noise. Such noise is thus averaged out over the sequence of pictures.

(7) Set field display code: Encoding complexity for a video signal can be measured as the number of bits per picture. However, if the previously encoded video signal was generated using an inverse 3:2 pull-down telecine process, then frame pictures, repeat field frame pictures and lone field pictures are present in the previously encoded video signal. Repeat field frame pictures, frame pictures and lone field pictures can each have comparable numbers of bits. However, ordinary frame pictures are displayed for two field periods, repeat field frames pictures are displayed for three field periods and lone field pictures are displayed for a single field period. As such, although an encoded repeat field frame picture can have a comparable number of bits as a field picture, a savings has been achieved in the encoded video signal containing the repeat field frame. Specifically, using a comparable number of bits as the lone field frame, three field periods worth of displayable video has been encoded instead of only one. Accordingly, if the previously encoded video signal has pictures which are displayable over different numbers of fields, it is desirable to account for the number of fields over which such pictures are displayed in the complexity metric used by the statistical multiplexer computer 24 for allocating bandwidth.

(8) Set progressive picture mode: The previously encoded video may have been encoded as an interlaced sequence of pictures. However, the decoder which is to receive the reencoded video signal might only be able to accommodate progressive pictures. (The decoder may, for instance, be an MPEG-1 compliant decoder.) In such a circumstance, it is desirable for the encoders 20 and 20' to re-encode the interlaced frames as progressive frames (i.e., as if each field occurred at the same interval of time). In the alternative, according to MPEG-2, a non-progressive sequence can contain both field and frame pictures and the frame pictures can be either interlaced or progressive. If still or low motion pictures are detected, it might be desirable for the encoders 20 and 20' to re-encode some pictures as progressive frame pictures so as to conserve bits.

(9) Enable (retain or add)/disable (delete or refrain from generating) error-concealment motion vectors, slice headers or both: Error-concealment motion vectors enable reconstruction of corrupted rows of macroblocks. However, error-concealment motion vectors are strictly optional and occasionally are not needed in low channel error environments (e.g., if the channel is a storage medium such as an optical disc). Likewise, slice headers are also optional. Both, error-concealment motion vectors and slice headers require a certain number of bits for each picture which contains them. Thus, it is occasionally desirable for the encoders 20 and 20' to omit (i.e., delete previously encoded or refrain from generating new) error-concealment motion vectors, slice headers or both, in the re-encoded video signal in an effort to conserve bits. In the alternative, the encoders 20 and 20' can include (i.e., retain previously encoded or add newly generated) error-concealment motion vectors, slice headers or both in the re-encoded video signal.

(10) Change encoding mode decision function(s): As may be appreciated, the encoders 20 and 20' have much choice in encoding a video signal. For example, the following are decisions made during re-encoding: (a) choosing the group of picture structure (i.e., the number of P and B pictures between successive I pictures), (b) choosing to recognize a field as a repetition of the first displayed field of a frame, (c) choosing to encode a picture as a frame or as two fields, (d) choosing whether or not to skip a macroblock, (e) choosing whether or not to provide encoded data for a non-skipped macroblock, (f) choosing to inter encode or to intra encode a macroblock, (g) choosing to motion compensate a macroblock as a frame macroblock or as two field macroblocks (h) choosing a motion vector search range, (i) choosing the kind of prediction (forward only, backward only, bidirectional, dual prime) to perform on a macroblock, (j) choosing whether or not to provide coded data for a block, etc. Most of these choices are made by the encoders 20 and 20' evaluating one or more decision functions of an error produced from each available encoding mode. The evaluation of a decision function produces an affinity for choosing one of the encoding modes. The decision function can be a simple comparison with a threshold. Alternatively, the decision function is a more complex function, in which a bias is added to the error, a weight is multiplied with the error, and/or other parameters, such as the bit rate or the quantizer scale factor, are used in forming the decision. Any one of these decision mode functions can be varied by the encoders 20 and 20'.

(11) Change decision function(s) for following the encoding decisions made in forming the previously encoded video signal: The encoders 20 and 20' can use one or more decision functions for determining whether or not to follow an encoding decision in the previous picture, such as the decisions noted above. For example, the encoders 20 and 20' can choose whether or not to use the same motion vector in the re-encoding as was used in the previous encoding. The decision to follow the previous manner of encoding can be made globally or locally, e.g., a decision can be made for an entire group of pictures, for each picture, for each slice or for each macroblock.

(12) Enter special sequence processing: At times, it is desirable to force the encoders 20 and 20' to always follow the decisions previously made in forming the previously encoded video signal. For example, it might be desirable to force the encoders 20 and 20' to choose to the same selectable encoding modes during re-encoding as were chosen during the original encoding that formed the previously encoded video signal in reference pictures, or at least, in I pictures. Note that by choosing to re-encode only B pictures allows the encoder 20 or 20' to actually choose to use the same results for some macroblocks in such B pictures. On the other hand, if a P picture is re-encoded, then, it is possible that the motion compensation results in each B picture that depend thereon probably cannot be used. Likewise, if an I picture is re-encoded, it is likely that each P and B picture which follows the I picture (until the next I picture is encountered) must be re-encoded.

Preferably, the encoders 20 and 20' allocate a bit budget to each picture prior to encoding it. Each of the actions noted above will have some impact on the bit budget. Accordingly, some discussion of bit budgeting is provided herein.

First consider that the video buffer verifiers 26 and 26' according to the MPEG standard constantly ensure that a compliant decoder buffer, which temporarily stores the re-encoded video signals pending decoding, does not overflow or underflow. To that end, the video buffer verifiers 26 and 26' maintain a model of the decoder buffer. Such a model can be maintained using knowledge of the minimum storage capacity of the decoder buffer, the channel rate at which bits are inputted to the decoder buffer and the particular instant at which each picture is removed (as controlled by re-order processing and the interval of time at which various pictures are displayed).

Consider a period of time when the channel rate is constant. Over such a period, the decoder buffer fills with bits of the re-encoded video signal at the particular constant rate. All of the bits of one picture (including appended stuffing bits) are removed at some multiple of the picture display interval, which time depends on whether or not B pictures are present and whether or not repeat fields were omitted from the re-encoded video signal. As may be appreciated, with the decoder buffer filling at a constant rate, and entire pictures being removed at prescribed picture display intervals (e.g., intervals of one, two or three fields), decoder buffer fullness depends largely on the number of bits per encoded picture. Specifically, pictures with a small number of bits tend to fill up the decoder buffer as the fill rate of the decoder buffer is constant over intervals of time of at least one (typically more than one) encoded picture, yet only a small number of bits are removed at a prescribed picture display interval. On the other hand, pictures with a large number of bits tend to reduce the fullness of the decoder buffer as a large number of bits are removed each time such large pictures are removed.

An example of a bit budgeting process based on a posteriori gathered information is disclosed in U.S. Pat. No. 5,686,963. Once a bit budget is set for a picture, the budget of bits may be distributed over different subregions of the picture, for example, in proportion to a measure of complexity (need for bits to encode the sub-region). The number of bits allocated to a sub-region can then be distributed over each macroblock of the subregion, for example, in proportion to the relative activity of each macroblock vis-a-vis the other macroblocks of that subregion.

Such a process can be modified to account for information regarding upcoming events. In general, knowing that future pictures will require a relatively large number of bits (and therefore tend to lower the decoder buffer fullness), the encoders 20 and 20' can produce current pictures with smaller numbers of bits before such large pictures. The pictures with fewer numbers of bits will tend to fill the decoder buffer. The pictures with large numbers of bits will then tend to reduce the decoder buffer fullness. The encoders 20 and 20' can then produce pictures with smaller numbers of bits following the large pictures so as to refill the decoder buffer. In general, a shifting in how bits are allocated (i.e., within a single picture or on specific portion of the encoded representation of a picture) can be achieved.

The number of bits produced for a picture can be varied in a number of ways. First and foremost, the bit budget for a picture can be changed. This most commonly results in a change in quantizer scale factor to achieve the respective bit budget for a picture. However, other actions, such as actions (2)–(12) listed above, will impact the number of bits produced for a picture. Changing the channel rate will change the rate at which bits fill the model of the decoder buffer and therefore impact the bit budgets generated for pictures. Changing the spatial resolution of the pictures prior to encoding reduces the number of pixels to be encoded and thus the number of encoded bits. Spatially low pass filtering the pictures tends to reduce the magnitude of high frequency macroblock coefficients produced by the discrete cosine transformation, which in turn tends to reduce the amount of variable length encoded data needed to represent macroblock coefficient data. Modifying border pixels also tends to reduce the amount data needed to represent macroblock coefficient data. Likewise, temporal filtering tends to decrease picture to picture differences resulting in more skipped blocks and smaller prediction errors. Setting the field display code can lower the complexity measured for a previously encoded video signal with many omitted repeat fields, thereby resulting in lower channel bit rates allocated thereto by the statistical multiplexing computer 24. Setting progressive picture mode can reduce the amount of coded data for low motion sequences. Disabling (discarding or refraining from generating) error-concealment motion vectors and slice headers tends to save the number of bits normally allocated for such structures, thereby reducing the number of bits for such pictures. Likewise, enabling (retaining or adding) them costs a certain number of bits for including such structures. Reducing the affinity to choose intra coding instead of inter coding tends to reduce the number of bits needed to encode each picture. For example, in a very high bit rate previously encoded video signal, many macroblocks in B pictures may nevertheless be intra encoded as any savings in bits achieved through inter encoding would have to be spent on bit stuffing the B pictures to maintain the high bit rate. In contrast, when such extra bits are needed for other pictures of for other programs to be multiplexed together for contemporaneous transfer to the same channel, it is desirable to encode the B pictures using inter coding. In general, the affinity to follow previous encoding decisions can result in fewer bits for each picture.

One advantage provided by the systems 10 and 11 is the ability to splice two different previously encoded video signals together for seam less sequential transfer to the channel, decoding and presentation. That is, a preceding encoded video signal is transferred to a channel. Immediately thereafter, a succeeding encoded video signal is transferred to the channel so that the beginning of the succeeding video signal immediately follows the end of the preceding video signal and the stream carrying the two video signals through the channel is compliant across the splice.

This situation is particularly suitable for the broadcast television environment. Each commercial and each segment of a television show can be considered a different encoded video signal to be spliced together according to some sort of sequence. Preferably, both the television show and the commercials are previously encoded and stored pending transfer to the channel. Pre-encoded video signals tend to be encoded using a model of a decoder buffer that is presumed to have a certain initial fullness. However, the presumed fullness will almost always be inaccurate in the case of spliced encoded video signals intended for sequential transfer to the channel (and sequential presentation)—when the encoded data at the beginning of the second or succeeding encoded video signal is outputted, the decoder buffer will already have some fullness level that depends on the encoded pictures at the end of the preceding encoded video signal. Perhaps the worst case scenario is when the succeeding encoded video signal is encoded assuming some initial decoder buffer fullness which is higher than the actual decoder buffer fullness of a decoder which receives the previously encoded video signal. This is problematic because the pictures at the beginning of the succeeding encoded video signal may have small numbers of bits, thereby risking a decoder buffer overflow. In such a case, some re-encoding of the preceding, to-be-spliced video program may be desired to ensure that the decoder buffer does not overflow. The systems 10 and 11 are well-suited for such a task.

Specifically, the video source 12 can playback and transfer each previously encoded video signal in proper sequence through the elements 14, 16 and 22. That is, first the preceding video signal is outputted to the look ahead buffer 14 for scanning and then outputted to the transcoder 16 for transcoding. In the course of re-encoding the preceding, previously encoded video signal, the encoder 20 maintains a model of the decoder buffer. The pictures of the succeeding, previously encoded video signal are outputted to the look ahead buffer 14 or 14' immediately following the last picture at the end of the preceding, previously encoded video signal. The scanner 22 or 22' gathers information regarding a window of k pictures which can include n pictures of the preceding, previously encoded video signal and m pictures of the succeeding, previously encoded video signal (where m+n=k). Such information is transferred to the encoder 20 and 20'. As such, the re-encoding of the last p pictures (where $1 \leq p < k$) of the preceding, previously encoded video signal can be influenced by information gathered for (regarding encoding needs of) pictures at the beginning of the succeeding, previously encoded video signal. For instance, information can be gathered about the bits allocated for each of the m pictures at the beginning of the succeeding, previously encoded video signal and an optimal fullness for the decoder buffer which is to receive it. The encoders 20 and 20' can then re-encode the p video pictures at the end of the preceding, previously encoded video signal in an effort to achieve the decoder buffer fullness needed for the pictures at the beginning of the succeeding, previously encoded video signal. For example, the picture coding types can be changed for one or more of the p pictures at the end of the preceding, previously encoded signals.

The above discussion is merely illustrative of the invention. Those skilled in the art may devise numerous alternative embodiments without departing from the spirit and scope of the invention.

The claimed invention is:

1. A method for transcoding a previously encoded video signal to a second encoded representation thereof comprising the steps of:

(a) receiving k>1 previously encoded pictures of a previously encoded video signal in a buffer, (b) scanning each of said k previously encoded pictures in said buffer to gather information on each of said k previously encoded pictures, (c) allocating an encoding parameter to one of said k previously encoded pictures, which precedes each other one of said k previously encoded pictures in encoded order of said previously encoded video signal, based on said information gathered for each of said k previously encoded pictures, (d) decoding said one previously encoded picture, to produce a decoded picture, (e) re-encoding said decoded picture, to generate a re-encoded picture in a second encoded representation of said video signal, said re-encoding being performed in a fashion which depends on said encoding parameter allocated thereto, (f) splicing an end of said previously encoded video signal together with a beginning of another encoded video signal for sequential transfer to said channel, wherein said step (a) further comprises the step of storing a picture at an end of said previously encoded video signal and at least one picture at a beginning of said another video signal in said look ahead buffer, wherein said step (c) further comprises the step of gathering information regarding said at least one encoded pictures at a beginning of said another encoded video signal and said picture at an end of said previously encoded video signal, and wherein in step (e), said picture at an end of said previously encoded video signal is re-encoded in accordance with an encoding parameter allocated based on information gathered for said picture and for said pictures at a beginning of said another encoded video signal.

2. The method of claim 1 further comprising the steps of:

maintaining a model of a decoder buffer, determining a budget of bits to be produced in re-encoding said decoded picture, modifing said budget based on said encoding parameter, and re-encoding said decoded picture to produce a number of bits which depends on said modified budget.

3. The method of claim 1 wherein said step of re-encoding further comprising the steps of:

altering a model of a decoder buffer to fill at a channel rate indicated by said encoding parameter, and determining a budget of a number of bits to generate while re-encoding said decoded picture which avoids overflowing and underflowing said model of said decoder buffer.

4. The method of claim 1 further comprising the step of changing a resolution of said decoded picture in response to said encoding parameter prior to step (e).

5. The method of claim 1 further comprising the step of spatially low pass filtering said decoded picture, without changing a resolution of said picture, in response to said encoding parameter prior to step (e).

6. The method of claim 1 further comprising the step of modifying pixel data at a border of said decoded picture in response to said encoding parameter prior to step (e).

7. The method of claim 1 further comprising the step of temporally filtering said decoded picture depending on said encoding parameter prior to step (e).

8. The method of claim 1 further comprising the step of setting a field display code in measuring a complexity of said previously encoded pictures.

9. The method of claim 1 further comprising the step of re-encoding said decoded picture as a progressive picture or an interlaced picture depending on said encoding parameter.

10. The method of claim 1 further comprising the step of selectively including at least one of error-concealment motion vectors and slice headers in said re-encoded version of said decoding picture depending on said encoding parameter.

11. The method of claim 10 wherein said step of including comprises the step of retaining previously generated error concealment motion vectors.

12. The method of claim 11 wherein said step of including comprises the step of retaining previously generated slice headers.

13. The method of claim 1 further comprising the steps of adjusting an inter/intra decision function depending on said encoding parameter and motion compensating each macroblock of said decoded picture based on an affinity for intercoding said macroblock produced by evaluating said decision function.

14. The method of claim 1 further comprising the steps of adjusting an encoding mode decision function to change an affinity for selecting a particular encoding mode depending on said encoding parameter and encoding according to said particular encoding mode based on an affinity produced by evaluating said decision function.

15. The method of claim 1 further comprising the step of determining whether or not to choose the same encoding mode in re-encoding said decoded picture as was chosen to produce said one previously encoded picture based on said encoding parameter.

16. The method of claim 15 further comprising the step of if said decoded picture is an intra picture then always choosing said same macroblock encoding mode as was chosen to form said one previously encoded picture.

17. The method of claim 1 wherein said step (e) further comprises the step of selecting a picture type for encoding at least said decoded picture at an end of said previously encoded video signal.

18. The method of claim 1 wherein said gathered information pertains to a compressed representation of said previously encoded pictures.

19. The method of claim 1 wherein said gathered information indicates a compression efficiency of said previously encoded pictures.

20. The method of claim 1 wherein said gathered information indicates an encoding standard according to which each of said previously encoded pictures was encoded.

21. The method of claim 1 wherein said gathered information indicates one or more encoding parameters for each of said encoded pictures.

22. The method of claim 1 wherein said gathered information indicates a pre-compression characteristic of said previously encoded pictures.

23. The method of claim 1 wherein said step of scanning further comprises the step of:

(c1) at least partially decoding said previously encoded pictures.

24. The method of claim 23 wherein said step of scanning further comprises the step of:

(c2) re-encoding said at least partially decoded pictures.

25. The method of claim 1 further comprising the steps of allocating a first channel rate as said encoding parameter in step (c) and allocating a second channel rate for encoding a second video signal, a sum of said first and second allocated channel rates being less than or equal to a total channel rate of a channel to which said re-encoded video signal and said second video signal are transferred.

26. The method of claim 1 wherein said gathered information indicates a picture coding type for each of said previously encoded pictures.

27. The method of claim 1 wherein said gathered information indicates a total number of bits used to encode each of said previously encoded pictures.

28. The method of claim 1 wherein said gathered information indicates a total number of stuffing bits added to each of said previously encoded pictures.

29. The method of claim 1 wherein said gathered information indicates a total number of header bits of each of said previously encoded pictures.

30. The method of claim 1 wherein said gathered information indicates the number of bits used to represent variable length encoded data of macroblocks of said previously encoded pictures.

31. The method of claim 1 wherein said gathered information includes information indicating the number of bits used to represent variable length encoded data of macroblocks of said previously encoded pictures and information indicating the number of bits used to represent headers of such macroblocks.

32. The method of claim 1 wherein said gathered information indicates the field display code of each of said previously encoded pictures.

33. The method of claim 1 wherein said gathered information indicates the picture structure of each of said previously encoded pictures.

34. The method of claim 1 wherein said gathered information indicates the macroblock mode of macroblocks in each of said previously encoded pictures.

35. The method of claim 1 wherein said gathered information indicates the macroblock DCT format of macroblocks in each of said previously encoded pictures.

36. The method of claim 1 wherein said gathered information indicates the quantizer scale factor in each of said previously encoded pictures.

37. The method of claim 1 wherein said gathered information indicates the number of bits used to encode one or more selected portions of each of said previously encoded pictures.

38. The method of claim 1 wherein said gathered information indicates the quantizer scale factor in one or more selected portions of each of said previously encoded pictures.

39. The method of claim 1 wherein said gathered information indicates the motion vector ranges used in encoding said previously encoded pictures.

40. The method of claim 1 wherein said gathered information indicates encoded motion vectors of each of said previously encoded pictures.

41. The method of claim 1 wherein said gathered information indicates a number of bits used to encode at least one of error-concealment motion vectors and slice headers.

42. The method of claim 1 wherein said gathered information indicates the channel bit rate, as measured from a transport delivery of said previously encoded video signal.

43. An apparatus for transcoding a previously encoded video signal to a second encoded representation thereof comprising:
   (a) a buffer for receiving k>1 previously encoded pictures of a previously encoded video signal,
   (b) a scanner for scanning each of said k previously encoded pictures in said buffer to gather information on each of said k previously encoded pictures, and for allocating an encoding parameter to one of said k previously encoded pictures, which precedes each other one of said k previously encoded pictures in encoded order of said previously encoded video signal, based on said information gathered for each of said k previously encoded pictures,
   (c) a decoder for decoding said one previously encoded picture, to produce a decoded picture, and
   (d) an encoder for re-encoding said decoded picture, to generate a re-encoded picture in a second encoded representation of said video signal, said re-encoding being performed in a fashion which depends on said encoding parameter allocated thereto,
   wherein said apparatus is configured for splicing an end of said re-encoded video signal together with a beginning of another encoded video signal for sequential transfer to said channel,
   wherein said buffer is also for storing a picture at an end of said re-encoded video signal and at least one picture at a beginning of said another video signal in said look ahead buffer,
   wherein said scanner is also for gathering information regarding said at least one encoded pictures at a beginning of said another encoded video signal and said picture at an end of said previously encoded video signal, and
   wherein said encoder is also for re-encoding said picture at an end of said previously encoded video signal in accordance with an encoding parameter allocated based on information gathered for said picture and for said at least one picture at a beginning of said another encoded video signal.

44. The apparatus of claim 43 wherein said encoder is also for maintaining a model of a decoder buffer, for determining a budget of bits to be produced in re-encoding said decoded picture, for modifying said budget based on said encoding parameter, and for re-encoding said decoded picture to produce a number of bits which depends on said modified budget.

45. The apparatus of claim 43 further comprising:
   a statistics computer for altering a model of a decoder buffer to fill at a channel rate indicated by said encoding parameter,
   said encoder also for determining a budget of a number of bits to generate while re-encoding said decoded picture which avoids overflowing and underflowing said model of said decoder buffer.

46. The apparatus of claim 43 wherein said encoder is also for changing a resolution of said decoded picture in response to said encoding parameter prior to re-encoding.

47. The apparatus of claim 43 wherein said encoder is also for spatially low pass filtering said decoded picture, without changing a resolution of said decoded picture in response to said encoding parameter prior to re-encoding.

48. The apparatus of claim 43 wherein said processor is also for modifying pixel data at a border of said decoded picture in response to said encoding parameter prior to re-encoding.

49. The apparatus of claim 43 wherein said encoder is also for temporally filtering said decoded picture depending on said encoding parameter prior to re-encoding said decoded picture.

50. The apparatus of claim 43 further comprising a statistics computer for setting a field display code in measuring a complexity of said previously encoded pictures.

51. The apparatus of claim 43 wherein said encoder is also for re-encoding said decoded picture as a progressive picture or an interlaced picture depending on said encoding parameter.

52. The apparatus of claim 43 wherein said encoder is also for selectively including at least one of error-concealment motion vectors and slice headers in said re-encoded version of said decoding picture depending on said encoding parameter.

53. The apparatus of claim 52 wherein said encoder is also for retaining previously generated error concealment motion vectors.

54. The apparatus of claim 52 wherein said encoder is also for retaining previously generated slice headers.

55. The apparatus of claim 43 wherein said encoder is also for adjusting an inter/intra decision function depending on said encoding parameter and for motion compensating each macroblock of said decoded picture based on an affinity for intercoding produced by evaluating said decision function.

56. The apparatus of claim 43 wherein said encoder is also for adjusting an encoding mode decision function to change an affinity for selecting a particular encoding mode depending on said encoding parameter and for encoding according to said particular encoding mode based on an affinity produced by evaluating said decision function.

57. The apparatus of claim 43 wherein said encoder is also for determining whether or not to choose the same encoding mode in re-encoding said decoded picture as was chosen to produce said one previously encoded picture based on said encoding parameter.

58. The apparatus of claim 57 wherein said encoder is also for, if said decoded picture is an intra picture then, always choosing said same macroblock encoding mode as was chosen to form said one previously encoded picture.

59. The apparatus of claim 43 wherein said encoder is also for selecting a picture type for encoding at least said decoded picture at an end of said previously encoded video signal.

60. The apparatus of claim 43 wherein said gathered information pertains to a compressed representation of said previously encoded pictures.

61. The apparatus of claim 43 wherein said gathered information indicates a compression efficiency of said previously encoded pictures.

62. The apparatus of claim 43 wherein said gathered information indicates an encoding standard according to which each of said previously encoded pictures was encoded.

63. The apparatus of claim 43 wherein said gathered information indicates one or more encoding parameters for each of said encoded pictures.

64. The apparatus of claim 43 wherein said gathered information indicates a pre-compression characteristic of said previously encoded pictures.

65. The apparatus of claim 43 wherein said scanner comprises a decoder for at least partially decoding said previously encoded pictures.

66. The apparatus of claim 43 wherein said scanner further comprises an encoder for re-encoding said at least partially decoded pictures.

67. The apparatus of claim 43 further comprising a statistics computer for allocating a first channel rate as said encoding parameter and allocating a second channel rate for encoding a second video signal, a sum of said first and second allocated channel rates being less than or equal to a total channel rate of a channel to which said re-encoded video signal and said second video signal are transferred.

68. The apparatus of claim 43 wherein said gathered information indicates a picture coding type for each of said previously encoded pictures.

69. The apparatus of claim 43 wherein said gathered information indicates a total number of bits used to encode each of said previously encoded pictures.

70. The apparatus of claim 43 wherein said gathered information indicates a total number of stuffing bits added to each of said previously encoded pictures.

71. The apparatus of claim 43 wherein said gathered information indicates a total number of header bits of each of said previously encoded pictures.

72. The apparatus of claim 43 wherein said gathered information indicates the number of bits used to represent variable length encoded data of macroblocks of said previously encoded pictures.

73. The apparatus of claim 43 wherein said gathered information includes information indicating the number of bits used to represent variable length encoded data of macroblocks of said previously encoded pictures and information indicating the number of bits needed to represent the headers of such macroblocks.

74. The apparatus of claim 43 wherein said gathered information indicates the field display code of each of said previously encoded pictures.

75. The apparatus of claim 43 wherein said gathered information indicates the picture structure of each of said previously encoded pictures.

76. The apparatus of claim 43 wherein said gathered information indicates the macroblock mode of macroblocks in each of said previously encoded pictures.

77. The apparatus of claim 43 wherein said gathered information indicates the macroblock DCT format of macroblocks in each of said previously encoded pictures.

78. The apparatus of claim 43 wherein said gathered information indicates the quantizer scale factor in each of said previously encoded pictures.

79. The apparatus of claim 43 wherein said gathered information indicates the number of bits used to encode one or more selected portions of each of said previously encoded pictures.

80. The apparatus of claim 43 wherein said gathered information indicates the quantizer scale factor in one or more selected portions of each of said previously encoded pictures.

81. The apparatus of claim 43 wherein said gathered information indicates the motion vector ranges used in encoding said previously encoded pictures.

82. The apparatus of claim 43 wherein said gathered information indicates encoded motion vectors of each of said previously encoded pictures.

83. The apparatus of claim 43 wherein said gathered information indicates a number of bits used to encode error-concealment motion vectors, slice headers or both.

84. The apparatus of claim 43 wherein said information indicates the channel bit rate, as measured from a transport delivery of said previously encoded video signal.

\* \* \* \* \*